United States Patent Office 2,701,271
Patented Feb. 1, 1955

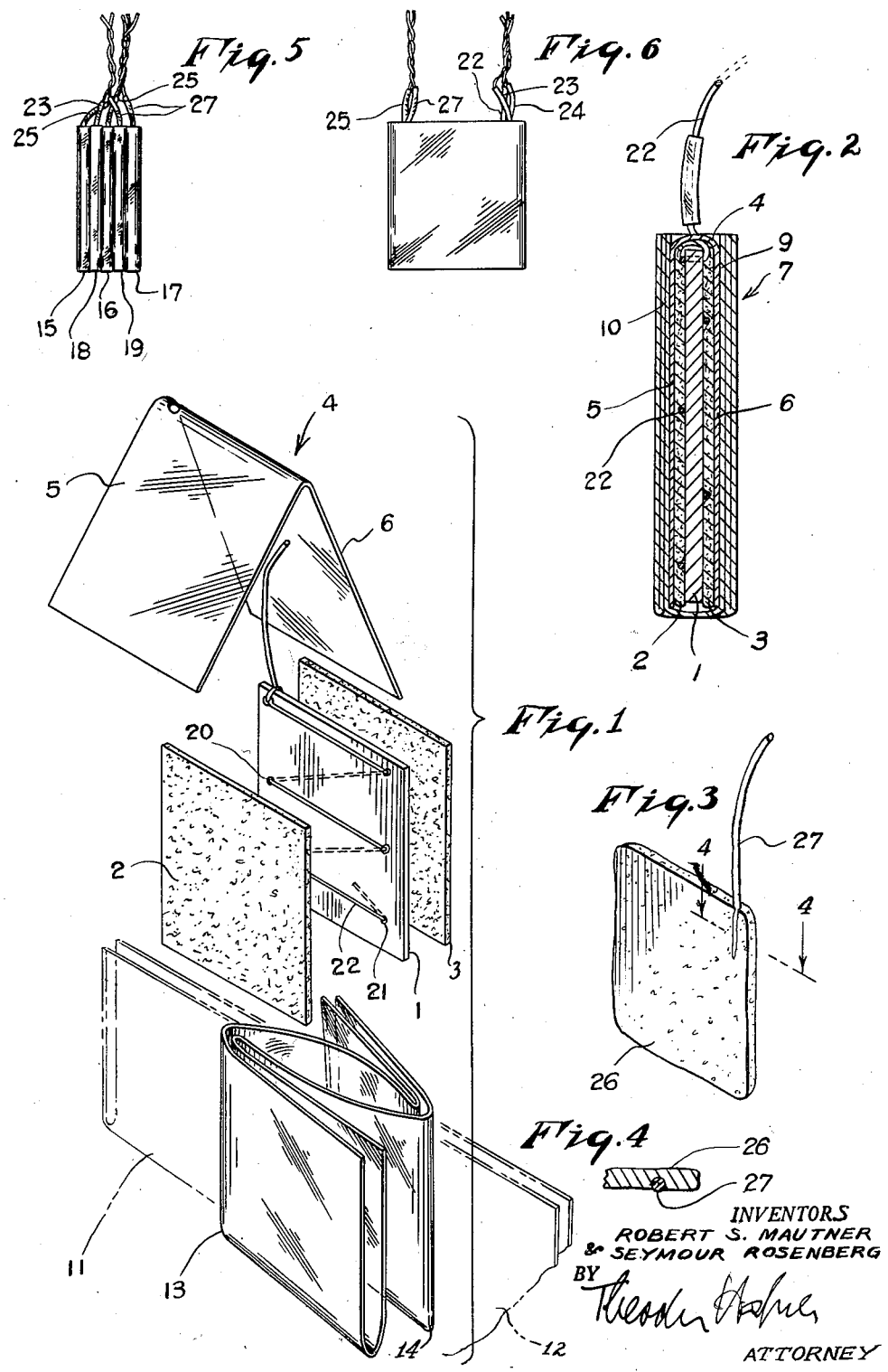

2,701,271

ALKALINE TYPE SILVER CELL

Robert S. Mautner, Massapequa, and Seymour Rosenberg, Bronx, N. Y., assignors to Electrocell Corporation, a corporation of New York Application November 2, 1953, Serial No. 389,755

9 Claims. (Cl. 136—6)

This invention relates to the manufacture of electric batteries particularly of the alkaline silver-zinc type.

One of the objects of this invention is to provide a diaphragm or wrapping for the individual electrodes which allows ionic conduction of electricity while preventing electronic conduction of electric currents. This wrapping is such that the circulation of electrolyte is not impaired.

A further object of this invention is to provide a wrapping for the individual electrodes to be applied without involving skill in assembly and costly material yet applied in such a manner as to insure a permanent spacing and protection for the entire life of the battery.

These and other objects of this invention will be more fully understood from the drawings enclosed herewith in which Fig. 1 represents in an exploded perspective view a negative electrode wrapped in accordance with certain principles of the invention.

Fig. 2 represents an enlarged cross section view of such electrode.

Fig. 3 represents a perspective view of an unwrapped positive electrode.

Fig. 4 represents an enlarged cross section through such electrode.

Figs. 5 and 6 in side and front views respectively represent an assembly of several electrodes of opposite polarity forming a multi-plate construction for a battery cell.

In accordance with this invention a wrapping material such as cellophane sheet or other alkali resistant membranes of about 1 mil thickness is applied in the following manner:

First a sheet 4 of approximately electrode width is folded around negative electrode 1 and wettening sheets 2, 3 in one direction, for example, horizontally, forming an inverted V-shaped figure having sides such as indicated in Fig. 1 at 5, 6 respectively.

Thereafter, another sheet 7 is wrapped around in such a way that at first a sheet of substantially larger width than the width of electrode 1 and sheet 4 as schematically indicated in Fig. 1 by dotted outline of flaps 11 and 12, is folded over the assembly consisting of electrode 1, wettening sheets 2 and 3 and wrapping layers 5 and 6 of sheet 4. This second folding operation is caused to occur in a direction substantially opposite to the direction of the first folding operation, resulting in sides 9 and 10 of sheet 7, assuming an upright V-shaped figure as shown in Fig. 2.

Thereafter folded sides 9 and 10, which as stated above are of substantially larger width than that of electrode 1 and form flaps 11, 12 are folded again in a direction substantially perpendicular to the two first mentioned folding directions also in opposite directions to each other, thus resulting in a Z shape overlap such as indicated in Fig. 1 in full lines.

In this way a relatively tight sealing of the electrode plate is achieved without however impairing effective circulation of the electrolyte around electrode 1.

Experiments underlying this invention have shown that it is particularly important to have the lower corners 13, 14 of the wrapping completely closed; it has been found that just at these lower corners if they are not completely closed and protected by the wrapping, during the charging of the battery zinc is formed in relatively fine needles causing short circuits by budging to the adjacent positive electrode. It has been our experience that premature failures have occurred in similar battery systems because of the absence of this type of protection at the corners and edges of wrapped electrodes.

In Figs. 5 and 6 the invention is shown as applied to a cell consisting of an assembled group of positive and negative electrodes.

In this case there are three negative electrodes 15, 16 and 17 each wrapped in the manner shown in Figs. 1 and 2 and two positive electrodes 18, 19 also wrapped in a manner similar to that shown in Figs. 1 and 2 except that wettening sheets 2, 3 have been omitted. The number and size of possible electrode plates are unlimited.

As apparent from perspective view shown in Fig. 1 and the section shown in Fig. 2, negative electrode plate 1 is perforated at 20, 21 with a copper wire 22 passing through perforations in intimate contact with both sides of negative plate 15 and extending therefrom at one of its upper edges. Copper wire 22 and the corresponding copper terminals 23, 24 derived from negative electrodes 16, 17 in a similar manner are twisted around each other forming the common negative terminal wire of plate 15 to 19.

Copper wires 22, 23, 24, especially where in contact with negative plates 15, 16, 17 are slightly amalgamated to reduce undesired side reactions to a minimum and allow the establishment of a uni-potential contact between electrode and connector.

As shown for example in Figs. 3 and 4, positive electrodes 18, 19 contain a pressed silver oxide plate provided with a terminal wire 27 which is of silver. The positive plate is largely of silver oxide with a small proportion of precipitated silver powders.

The invention is not limited to the form, structure and arrangement of electrode wrappings, wetting and terminal elements and connections shown and described, but may be applied to all shapes and types of electrode plates and plate arrangements without departing from the scope of this invention.

We claim:

1. In an electric storage battery, an electrode plate, a wrapping sheet folded over said plate in one direction and of a width substantially equal to the width of said plate, and another wrapping sheet folded over the first wrapping sheet in a direction opposite to said first direction and of a width substantially larger than that of said plate; the portion of said second wrapping sheet extending beyond the width of said plate being folded back over the central portion of said second wrapping sheet so as to form an enclosure for the bottom corners of said electrode plate.

2. Battery according to claim 1 comprising wetting means arranged between said plate and said first wrapping sheet, said plate being a negative polarity electrode.

3. Battery according to claim 1 wherein said second wrapping sheet is about three times the width of said electrode plate so as to permit said second wrapping sheet when folded over said first wrapping sheet to project on each side of said electrode plate by about the width of said plate; the projections being folded around and over opposite sides of the center portion.

4. Battery according to claim 1 comprising an opening near the top corner of the first wrapping and a wire attached to said electrode and extending through said top opening.

5. Battery according to claim 4 wherein for plates of opposite polarity said top openings are provided on opposite corners of said first wrappings.

6. Battery according to claim 4 wherein for a negative electrode said terminal wire is attached to both sides of the electrode plate, perforations being provided in said plate to permit said wire to pass from one side of said plate to the other.

7. Battery according to claim 4 wherein for a negative electrode said terminal wire is attached to both sides of the electrode plate, perforations being provided in said plate to permit said wire to pass from one side of said plate to the other, said negative electrode being a zinc plate and said terminal wire being a copper wire making electrical contact with said zinc plate, and extending from a corner of said zinc plate.

8. Battery according to claim 4 wherein for a positive electrode said wire is pressed into said plate.

9. Battery according to claim 4 wherein for a positive electrode said wire is pressed into said plate, said positive electrode being a plate composed of powdered mixture of silver oxide particles and a lesser percentage of precipitated silver particles, and said terminal wire being a silver wire pressed into said mixture and extending from a corner of said silver plate.

References Cited in the file of this patent

UNITED STATES PATENTS 2,549,710     Andre _____ Apr. 29, 1952